United States Patent [19]

Akao

[11] Patent Number: 4,787,506
[45] Date of Patent: Nov. 29, 1988

[54] MAGAZINE FOR PHOTOSENSITIVE MATERIALS

[75] Inventor: Mutsuo Akao, Kanagawa, Japan

[73] Assignee: Fuji Photo Film Co., Ltd., Kanagawa, Japan

[21] Appl. No.: 36,438

[22] Filed: Apr. 9, 1987

[30] Foreign Application Priority Data

Apr. 12, 1986 [JP] Japan .................................. 61-84815

[51] Int. Cl.$^4$ .............................................. B65D 85/67
[52] U.S. Cl. ..................... 206/395; 206/484; 242/71.1
[58] Field of Search ............... 206/269, 273, 316, 395, 206/409, 455, 484, 811; 242/68.7, 71.1, 71.7

[56] References Cited

U.S. PATENT DOCUMENTS

| | | | |
|---|---|---|---|
| 1,828,955 | 10/1931 | Bornmann | 206/316 |
| 3,932,693 | 1/1976 | Shaw et al. | 206/811 |
| 4,147,291 | 4/1979 | Akao et al. | 206/455 |
| 4,212,389 | 7/1980 | Robbins | 206/316 |
| 4,258,848 | 3/1981 | Akao et al. | . |
| 4,331,725 | 5/1982 | Akao | . |
| 4,337,285 | 6/1982 | Akao et al. | 206/455 |
| 4,356,224 | 10/1982 | Akao et al. | . |
| 4,359,499 | 11/1982 | Akoa et al. | 206/455 |
| 4,386,124 | 5/1983 | Akao | . |
| 4,411,943 | 10/1983 | Akao | . |
| 4,411,945 | 10/1983 | Akao et al. | . |
| 4,413,734 | 11/1983 | Newcombe, Jr. | 206/455 |
| 4,436,809 | 3/1984 | Akao et al. | . |
| 4,452,846 | 6/1984 | Akao | . |
| 4,469,741 | 9/1984 | Akao | . |
| 4,505,387 | 3/1985 | Seto | 206/316 |
| 4,513,050 | 4/1985 | Akao | 206/455 |
| 4,565,733 | 1/1986 | Akao | . |
| 4,565,743 | 1/1986 | Akao | . |
| 4,576,865 | 3/1986 | Akao | . |
| 4,579,781 | 1/1986 | Akao | . |
| 4,584,234 | 4/1986 | Hirose et al. | . |
| 4,587,175 | 5/1986 | Akao | . |
| 4,629,640 | 12/1986 | Akao | . |
| 4,639,386 | 1/1987 | Akao | . |
| 4,653,640 | 3/1987 | Akoa | 206/455 |
| 4,661,395 | 4/1987 | Akao | . |
| 4,661,401 | 4/1987 | Akao | . |
| 4,663,218 | 5/1987 | Akao | . |
| 4,687,692 | 8/1987 | Akao | . |

FOREIGN PATENT DOCUMENTS

| | | | |
|---|---|---|---|
| 3127043 | 1/1983 | Fed. Rep. of Germany | 206/316 |
| 2503400 | 10/1982 | France | 206/316 |
| 161948 | 12/1981 | Japan | 206/316 |
| 57-10139 | 1/1982 | Japan | 206/316 |

Primary Examiner—David T. Fidei
Attorney, Agent, or Firm—Burns, Doane, Swecker & Mathis

[57] ABSTRACT

A magazine for a roll of a photosensitive strip material which comprises a core rotatably supporting the roll and a light-shielding container body admitting the core and having an opening for drawing out the photosensitive strip material and light-shielding teremp cloth piece(s) provided at the above opening, and which is characterized in that the wall of the container body is formed by paper board and a multilayer film superposed thereon containing a metal foil layer or a metallized flexible sheet layer being visible from the outside and that the ground fabric structure of the above teremp cloth is knit structure.

This magazine is superior in moistureproofness, gas barrier, dustproofness, thermal-shielding, water proofness and antistatic property. Deformation of the opening for drawing out hardly occurs, and leakage of light and moisture do not occur. Even though this magazine is left in the sunlight for a long time, inner temperature of the magazine is not so raised. Quality of the photosensitive strip material packaged by this magazine is kept for a long period irrespective of outside conditions. The magazine of the invention is inexpensive, and its waste treatment is easy.

10 Claims, 3 Drawing Sheets

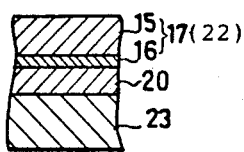
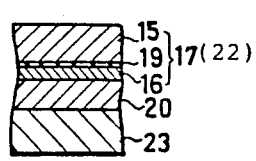
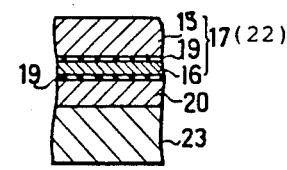
FIGURE 4　　　　FIGURE 5　　　　FIGURE 6
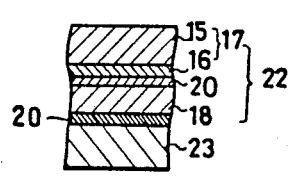
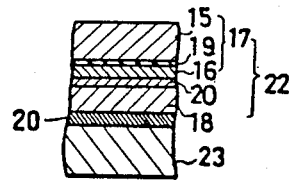
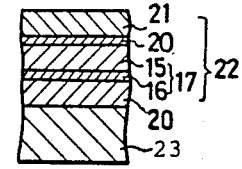
FIGURE 7　　　　FIGURE 8　　　　FIGURE 9
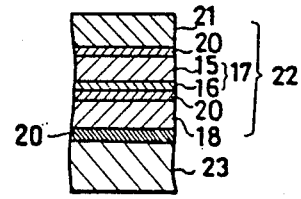
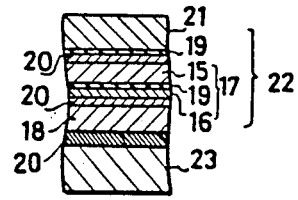
FIGURE 10　　　FIGURE 11
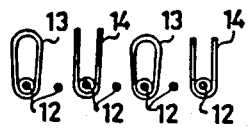
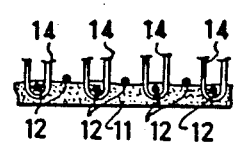
FIGURE 12　　　FIGURE 13

MAGAZINE FOR PHOTOSENSITIVE MATERIALS

BACKGROUND OF THE INVENTION

1. Field of the Invention

This invention relates to a magazine for a roll of a photosensitive strip material such as a roll film for photocomposition, a roll of printing paper for photocomposition, a roll of microfilm and a roll of diazo film admitting in a drawable state.

2. Description of Prior Art

Various magazines for photosensitive materials have been developed. For example, they are disclosed in Japanese Utility Model KOKOKU No. 56-16608, Japanese Utility Model KOKAI Nos. 55-88980 and 60-167796, Japanese Patent KOKAI Nos. 55-124140, 57-128333 and 60-156058, Japanese Patent KOKOKU No. 59-36736, U.S. Pat. Nos. 4,034,929, 4,179,028 and 4,272,035.

The magazine of Japanese Patent KOKOKU No. 59-36736 is a box-shaped made of an almost square frame of which both openings are attached with end panels. The frame is made of a plastic such as polystyrene, ABS or polyethylene, and the end panel having a core is also made of a plastic material. A light-shielding teremp cloth is attached to the opening for drawing out of the box-shaped magazine. Structure of the teremp cloth may be velvet (Japanese Utility Model KOKOKU No. 46-20539) or electrostatic flocking (Japanese Patent KOKAI No. 54-36924). This magazine was expensive. Moreover, when it was left in the sunlight for a long period, it was sometimes deformed by absorption of heat to cause imperfect light-shielding, defective appearance and unsmooth drawability in photosensitive strip material. In addition, in the case of the conventional light-shielding teremp cloth, fray or falling out of pile yarn happened. Particularly, adhesion of pile yarn dust is a serious problem under high temperature and high humidity conditions because of swelling and increasing adhesion of gelatin layer.

SUMMARY OF THE INVENTION

Thus, an object of the invention is to provide a magazine for a roll of a photosensitive strip material not giving rise to troubles in exposure and development caused by adhesion of pile yarn dust.

Another object of the invention is to provide a magazine for a roll of a photosensitive strip material which is superior in moisture-proofness, thermal-shielding, appearance and light-shielding.

Still another object of the invention is to provide a magazine for a roll of a photosensitive strip material which is inexpensive.

The present invention provides a magazine for a roll of a photosensitive strip material which has achieved these objects. In brief, a combination of a paper board and a multilayer film containing a metal thin film layer (aluminium metallized film, etc.) is used as its wall material, and a teremp cloth having knit structure is used as its light-shielding teremp cloth for opening.

BRIEF DESCRIPTION OF THE DRAWINGS

FIGS. 4 to 11 are sectional views of combinations of a paper board and a multilayer film used for container bodies of the invention.

FIGS. 12 and 13 are schematically illustrated sectional views of teremp cloths.

FIG. 14 is a perspective view indicating a side frame member of the container body.

FIG. 15 is a sectional view of an end panel having a core which is integrally provided.

FIG. 16 is a perspective view of the developed side frame member.

DETAILED DESCRIPTION OF THE INVENTION

The magazine of the invention comprises a core and a container body.

The core rotatably supports a roll of a photosensitive strip material. It may directly be fixed on the wall of the container body, or it may be made self-standing by introducing a pair of support panel members which supports the core.

Figure 3:
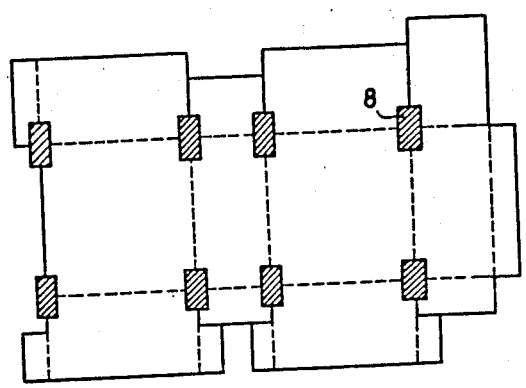
FIG. 3 is a development of the container body of the above magazine.

The container body is light-shielding, and usually a box-shaped. It has an opening for drawing out the photosensitive strip material, and light-shielding teremp cloth is attached to the opening. The container body may be constructed by one sheet of paper board together with a multilayer film as shown in FIG. 3. However, it may be constructed by combining two or more pieces. For example, its lid or a pair of side panels may separately be provided. The container body is fundamentally made of a paper board and a multilayer film described later. However, one or two panels may be made of other materials such as plastic.

As the paper board, corrugated board or cardboard is usable. Suitable thickness is 300 $\mu$m to 5 mm.

The multilayer film contains a metal foil layer or a metallized flexible sheet layer.

The metal foil includes aluminum foil, tin foil, lead foil and thin iron foil formed by electrolysis, and aluminum foil having a thickness of 6 to 20 $\mu$m is preferable in terms of moisture-proofness, gas barrier, waterproofness, thermal-shielding and light-shielding ability.

The metallized flexible sheet layer is composed of a base flexible sheet and a metallic membrane integrally formed thereon.

As the base flexible sheet, thermoplastic resin films, paper and cellophane are usable. The preferable thermoplastic resin films are polypropylene films, nylon films, polyethylene films and polyester films. Suitable thickness is 7 to 70 $\mu$m, preferably 8 to 40 $\mu$m, more preferably 10 to 30 $\mu$m. The most preferable base flexible sheets are uniaxially or biaxially oriented (including stretched) films having 10 to 30 $\mu$m in thickness. Unstretched polypropylene film is preferable in terms of physical strength and inexpensiveness. Extremely thin reinforced high-density polyethylene film of which blow-up ratio is elevated is also preferable in terms of physical strength and inexpensiveness.

The metallic membrane layer may be formed of a pure metal such as Al, Sn, Zn, Co, Cr, Ni, Fe, Cu, Ag, Au, etc., alloys thereof, or any other metals of which metallic membrane layer can be made, but aluminum is the most preferable in terms of processing an cost.

Thickness of metallic membrane layer to be metallized is 50 to 1200 Å. When the thickness is thinner than 50 Å, antistatic property and gas barrier of the film is insufficient. Moreover, in order to secure moistureproof and light-shielding, thickness of other layers such as the flexible sheet layer or other layers of the laminate must be increased. On the other hand, when the thickness is thicker than 1200 Å, degradation of the flexible sheet occurs by the heat of metallizing, and strength of the laminated film to be produced falls. In the case of aluminum-metallized membrane, preferable thickness is thicker than 70 Å, more preferably 80 to 800 Å, further more preferably 100 to 600 Å.

Metallization is carried out according to a known method, such as vacuum evaporation, sputtering, ion plating, or electron beam heating. Among them, vacuum evaporation is preferable. The metallic membrane layer may be formed one face or both faces of the flexible sheet layer.

In order to raise adhesive strength, surface of the basic thermoplastic resin film may be activated by a known method, or an under coat layer (anchor coat layer) may be provided on the surface.

Representative methods to raise adhesive strength between a metallic membrane and a thermoplastic resin film are described below.

(A) Activation of surface of a thermoplastic resin film
  (1) Activation by corona discharge
  (2) Activation by ultraviolet irradiation
  (3) Activation by flame treatment
  (4) Activation by dichromate treatment
  (5) Activation by an oxidizing agent such as mixed acid (B) Coating of a substance having affinity for metal on the surface activated by one of the method of (1) (Application of another coat)
  (1) Coating of polyester resin solution
  (2) Coating of polyamide resin solution
  (3) Coating of polyurethane resin solution
  (4) Coating of epoxy resin solution
  (5) Coating of cellulose derivative resin solution
  (6) Coating of polyvinyl acetate resin solution
  (7) Coating of polyvinyl butyral resin solution
  (8) Coating of EAA, EEA or EMA resin solution
  (9) Coating of anchoring agent such as titanium compound, imine compound or isocyanate compound (C) Undercoating of one of the resin of (2) such as epoxy resin before metallization and overcoating of one of the protection resin described later such as butyral resin after metallization (D) Short heat treatment of a thermoplastic resin film near the melting point before or after metallization (E) Blending of a substance having affinity for metal to a thermoplastic resin film A protection layer may be provided on the metallic membrane layer in order not only to protect the metallic membrane layer but also to raise or adjust delamination resistance. As the resin for the protection layer, butyral resin, acrylic resin, cellulose resins such as cellulose acetate resin, urethane resin, epoxy resin, polyester resin, ionomer resin, EEA resin, various polyethylene resins and various polypropylene resins and various polypropylene resins are usable. Wax, gelatin and polyvinyl alcohol are also usable. Thickness of the protection layer is made extremely thin such as thinner than 50 $\mu$m, preferably thinner tan 5 $\mu$m, in order to eliminate static electricity effectively. Such a protection layer may be formed by a known solution coating or spray coating.

Appearance of at least one face of the multilayer film must be silver, and accordingly, when a layer such as the above anchor coat layer or the protection layer is provided, every layer laminated on one side of the metal foil layer or the metallized flexible sheet layer should be transparent or translucent.

One or more flexible sheet layers may be incorporated in the multilayer film in order to improve physical strength, moisture-proofness, thermal shielding, prevention of curling or the like. The flexible sheet(s) may be provided one or both sides of the metal foil layer or the metallized flexible sheet layer. In this case, every flexible sheet located on one side should be transparent or translucent in order to secure thermal-shielding by the metal foil layer or the metallized flexible sheet layer.

Transparent or translucent flexible sheets suitable for the magazine of the invention include uniaxially or biaxially oriented (including stretched) thermoplastic resin films and cellophane. The thermoplastic resin film may be a coextruded film composed of two or more layers. Preferable thermoplastic resin films are biaxially stretched polyester films, biaxially stretched polypropylene films, biaxially stretched nylon films and biaxially stretched polyethylene films.

On the other hand, the multilayer film may be a metallized flexible sheet layer alone.

Light-shielding teremp cloth is attached to the inner faces opposite to each other of the opening for drawing out a photosensitive strip material. The teremp cloth is superior in view of not forming scratches on the face of the strip material. Various teremp cloths, such as the teremp cloth having a knit structure, the teremp cloth having velvet structure and the teremp cloth formed by electrostatical flocking etc., are known. However, in the cases of the teremp cloths other than having knit structure, troubles caused by fray or falling out of pile yarn are problems.

The above problems of the above teremp cloths are considered to be improved by utilizing pile knit (raising knit) which is pile texture of knitted fabric. Even in this case, in order to improve the defect that pile yarn is liable to fall out, fixation degree of pile yarn is raised by using highly shrinkable yarn as ground yarn to constrict stitch by heat treatment or by using an adhesive. And, tips of the pile yarns are extended well by using special yarn capable of bulking by heat treatment. However, waste pile yarn dust formed during raising and shearing remains in plush, and it occasionally adheres on the surface of light-sensitive strip material.

In view of not occurring fray and not falling out of pile yarn, the teremp cloth of knitted fabric having looped piles are preferable. However, this teremp cloth is inferior to the following teremp cloth in light-shielding and softness.

The teremp cloth of knitted fabric of which a part of looped piles are opened (sheared) to form fluff is the most preferable for the present invention. Suitable ratio of looped piles is in the range of 90% to 20%, that is, ratio of fluffed piles is 10% to 80%. Preferable ratio of looped piles is in the range of 80% to 40%. Looped piles and fluffed piles are preferably arranged uniformly. Fluffed piles are preferably formed taller than looped piles like a semi-cut pile. In this case, fluffed piles are at the surface portion, and both looped piles and fluffed piles are at the inner portion. By this structure, falling out of pile yarn, softness, light-shielding, etc. are improved.

Structure of ground fabric is a knit structure which is generally double weave such as warp backed weave or weft backed weave. The above piles may be formed either by warp yarn or by weft yarn. The ground fabric may be set with heat or impregnated with an adhesive material for filling in order to prevent deformation of the teremp cloth.

Preferable material of the yarn forming the teremp cloth is a synthetic fiber of a thermoplastic resin such as nylon fiber, acrylic fiber, polyester fiber, vinylon (polyvinyl alcohol) fiber, vinyl chloride fiber, vinyl chloride-vinylidene copolymer fiber, polypropylene fiber, polyethylene fiber and polycarbonate fiber. These fibers are superior to natural fibers in the point capable of cutting by fusing such as heat-slitting or supersonic-slitting without forming a fray at the cut portion. Other superiorities of these fibers are uniform quality, small hygroscopicity, well heat setting after raising, large physical strength, etc. However, other synthetic fibers, such as rayon fiber and acetate fiber, and natural fibers such as cotton fiber and silk fiber may be used as itself or blended with the thermoplastic resin fiber according to the properties required. The teremp cloth may be composed of two or more kinds of yarns.

The teremp cloth should be colored with a dye or a pigment in order to secure light-shielding. Preferable color is a dark color, and black is the most preferable.

In the case of manufacturing the teremp cloth having a mixture of looped piles and fluffed piles, a knitted fabric having looped piles projected therefrom is first formed.

Such a knitted fabric may be prepared either from weft knitted fabric such as circularly knitted fabric and flatly knitted fabric or from warp knitted fabric such as tricot fabric, raschel fabric and milanese fabric by raising to form looped piles. On the other hand, the knitted fabric having looped piles may directly be formed by using a circular knitting machine or a circular hosiery knitting machine.

Particularly preferable knitted fabrics are sinker pile teremp cloths formed by using a circular knitting machine and French pile teremp cloths knitted by using a tricot warp knitting machine and then the weft of the knitted fabric is drawn out by needles to form loops. They are made of the yarn containing more than 50% of polyester fiber, acrylic fiber, or nylon fiber colored black.

In the case of using the teremp cloth of which all pile yarns are looped, the above teremp cloth may be used for the container of the invention as it is. On the other hand, in the case that a part of pile yarns are opened, such pile yarns are, for example, raised and then sheared to a definite length between the longest pile and the shortest pile. Since pile yarns have usually a distribution in length, the ratio of fluffed piles can be controlled by shearing length. In this regard, the knitted fabric, particularly the warp knitted fabric, of which loops are formed by drawing out by needles is preferable because of having a suitable distribution in length of the loops.

It is also preferable that a pair of teremp cloth pieces having wave-shaped surface is attached to the drawing out opening so that each crest of waves is engaged to each other.

In the magazine of the invention, the multilayer film mentioned previously is usually joined to the paper board so that silver face of the multilayer film is made outside. The multilayer film may be stuck with an adhesive or an adhesive tape on the developed form of the paper board of which the necessary cutting has been finished. The multilayer film may first be laminated on the paper board by a known laminating method such as extrusion laminating, hot melt laminating, dry laminating, wet laminating or the like, and then punched to the developed form of the magazine. The multilayer film may also be laminated on a linerboard for corrugated board by a known laminating method, and then joined to a flute and another linerboard to form silver corrugated board. This corrugated board is punched, cut or slit to the developed form of the magazine. Two pieces of the teremp cloth are adhered to each position corresponding to the opening for drawing out, and then the magazine is made.

The laminate should be located on the surface of the magazine so that appearance of the magazine is made silver. Another multilayer film may be laminated on the reverse face of the magazine.

The magazine of the invention may further be packaged by a monolayer or laminated film being moisture-proof, if necessary. This package may be a shrink package.

Kind of the light-sensitive strip material is not limited, and includes photographic printing paper, printing paper for computerized type-setting system and photographic film such as JIS 135-type.

In the magazine of the invention, since a metal foil layer or a metallized layer is incorporated, moisture-proofness, gas barrier, dustproofness, thermal-shielding, waterproofness, antistatic property, etc. are remarkably improved compared to the conventional magazine made of paper board. As a result, leakage of light and moisture through the opening for drawing out is prevented. This leakage occurs caused by deformation of the opening mainly based upon absorption of heat or water by paper board of a conventional magazine. Even though the magazine of the invention is left in the sunlight for a long time, inner temperature of the magazine is not so raised because most of the sunlight is reflected by the metal foil layer or the metallized layer located on the surface of the magazine.

On the other hand, when the magazine of the invention is compared with the conventional magazine made of plastic, the magazine of the invention is superior in deformation caused by heat. Moreover, this magazine is inexpensive, and its waste treatment is easy.

Quality of the photosensitive strip material packaged by the magazine of the invention is kept for a long period irrespective of outside conditions. Since each pile yarn winds round the warp or the weft of ground fabric, and therefore fray nor falling out of pile yarn does not occur. Generation of pile yarn dust during manufacturing process is minor, and troubles in exposure and development caused by adhesion of pile yarn dust are remarkably decreased. As to this matter, it is also contributed that gelatin layer of the photosensitive strip material packaged does not become sticky nor swelled by its superior thermal-shielding and moisture-proofness even under high temperature and high humidity conditions. The appearance of the magazine of the invention is silver and it is favorable to users.

EXAMPLES

Figure 1:
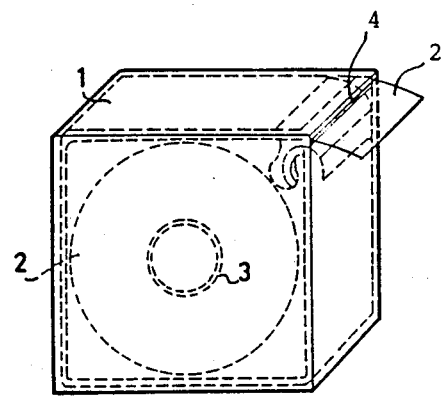
FIG. 1 is a perspective view of a magazine embodying the invention.
Figure 2:
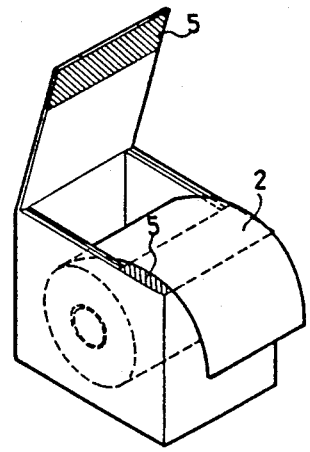
FIG. 2 is a perspective view of the same magazine where its upper face is opened.

An example of the magazine of the invention is illustrated in FIGS. 1 to 3.

In FIG. 1, 1 indicates a container body and a core 3 rotatably supporting a roll of photosensitive strip material 2 is provided in it. An opening 4 for drawing out the photosensitive strip material 2 is provided near one side of the container body 1, and a pair of lightshielding teremp cloth 5 pieces is sticked on the opening 4 as shown in FIG. 2.

The container body 1 is made of one sheet as shown in FIG. 3, and each flap is stuck with paste. A black paper piece 8 is provided at every corner.

The wall material of the container body is one of the combinations of a paper board and a multilayer film illustrated in FIGS. 4 to 11.

The wall material of FIG. 4 consists of a multilayer film 22 composed of a metallized flexible sheet layer 17 alone which consists of a transparent or translucent thermoplastic resin film layer 15 and an aluminum membrane layer 16 formed by vacuum evaporation, and a paper board 23 laminated thereunder through an adhesive layer 20.

In the wall material of FIG. 5, an anchor coat layer 19 is incorporated between the thermoplastic resin film layer 15 and the aluminum membrane layer 16 of the wall material of FIG. 4.

In the wall material of FIG. 6, one more anchor coat layer 19 is incorporated between the aluminum membrane layer 16 and the adhesive layer 20 of the wall material of FIG. 5.

The wall material of FIG. 7 consists of a multilayer film 22 composed of a metallized flexible sheet layer 17 which consists of the metallized flexible sheet layer 17 of FIG. 4 and a flexible sheet layer 18 laminated thereunder through an adhesive layer 20, and a paper board 23 further laminated thereunder through an adhesive layer 20.

In the wall material of FIG. 8, an anchor coat layer 19 is incorporated between the thermoplastic resin film layer 15 and the aluminum membrane layer 16 of the wall material of FIG. 7.

In the wall material of FIG. 9, a transparent or translucent flexible sheet layer 21 is further laminated on the wall material of FIG. 4 through an adhesive layer 20.

In the wall material of FIG. 10, a transparent or translucent flexible sheet layer 21 is further laminated on the wall material of FIG. 7 through an adhesive layer 20.

In the wall material of FIG. 11, a transparent or translucent flexible sheet layer 21 on the underside of which an anchor coat layer 19 is provided is further laminated on the wall material of FIG. 8 through an adhesive layer 20.

An example of the teremp cloth used for the magazine of the invention is schematically illustrated in FIG. 12. In this teremp cloth, pile yarn is knitted to warp 12 of the warp knitted fabric so as to form loop, and a part of the looped piles 13 are sheared to form fluffed piles 14.

The teremp cloth of FIG. 13 is conventional, and it has a velvet structure. The ground fabric is impregnated with an adhesive material for filling 11 in order to set pile yarn 14 to warp 12.

Figure 14:
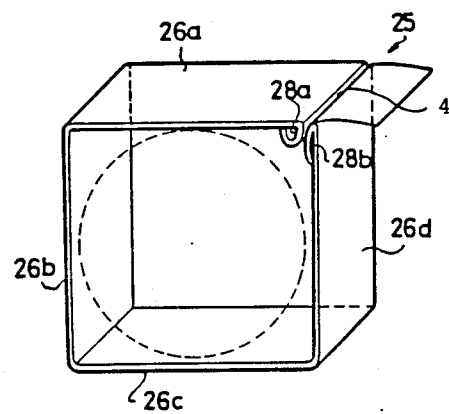
FIGS. 14 to 16 are the drawings explaining another example of the invention.
Figure 15:
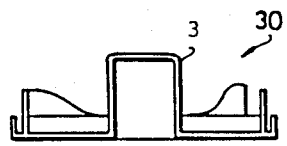
Figure 16:
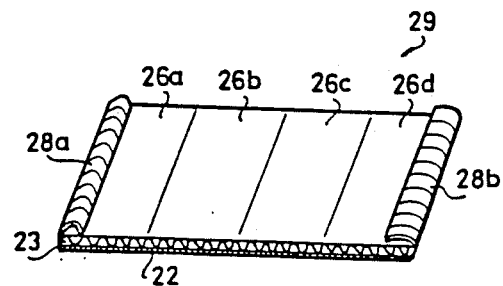

Another example of the magazine of the invention is illustrated in FIGS. 14 to 16. This magazine is made up of a side frame member 25 and a couple of end panels 30. As shown in FIG. 16 where the developed side frame member is illustrated, this member is composed of four panels 26a, 26b, 26c and 26d connected in series. Both ends 28a and 28b are turned up with rounded. When the side frame member 25 is formed, these ends 28a and 28b are faced to each other near one side to form the opening 4 for drawing out as shown in FIG. 14. This side frame member 25 is composed of a paper board 23 and a multilayer film 22.

The couple of end panels 30 is made of plastic, and a core 3 is projected at its center.

Subsequently, the magazine of the invention was compared with conventional magazines. The magazines tested were illustrated in FIGS. 1 to 3. The multilayer film 22 consisted of 12 $\mu$m in thickness of a transparent biaxially stretched polyester film 15 and 300 to 500 Å in thickness of an aluminum membrane layer 16 formed by vacuum evaporation. This multilayer film 22 was laminated on a kraft paper for a linerboard of corrugated board through 6 to 30 $\mu$m in thickness of an adhesive layer 20 containing a low-density polyethylene as a major component. This was used as a surface linerboard, and E-corrugated board was manufactured by using a known corrugated board manufacturing machine.

On the other hand, in the case of the conventional magazine 1, a black light-shielding paper was stuck on a paper board, and this was used as the wall material of the magazine. The teremp cloth of FIG. 13 having velvet structure was used, and stuck on the opening for drawing out.

The conventional magazine 2 was made of plastic containing carbon black, and the teremp cloth of FIG. 13 was also used.

The results are shown in the following table.

TABLE

|  | Invention | Conventional 1 | Conventional 2 | Test Method |
|---|---|---|---|---|
| Teremp Cloth Structure | Tricot Knitting | Velvet Weaving | Velvet Weaving | — |
| Fluffed Piles (%) | 30 | 100 | 100 | — |
| Looped Piles (%) | 70 | 0 | 0 | — |
| Light-Shielding | A | B | B | I |
| Fray at Cut Face | A | E | E | II |
| Falling Out of Piles | A | E | E | II |
| Pile Cutting Dust | A | E | E | II |
| Meander Movement | B | B | B | III |
| Scratches | B | B | B | IV |
| Cost Ratio | 30 | 100 | 100 | V |
| Container Body |  |  |  |  |
| Wall Material | Silver Film with Paper | Black Paper | Black Plastic | — |
| Moistureproofness | A | E | B | VI |
| Thermal-Shielding | A | E | E | VII |
| Deformation | B | E | C | VII |
| Appearance | A | C | B | — |

Evaluation are as follows:
A: very excellent  B: excellent
C: practical  D: having a problem
E: impractical
Testing methods are as follows:
  I A photographic color printing paper or a JIS 135 type photographic film of ASA 100 was admitted in each exemplified magazine, and the magazine was exposed to the light of 80,000 luxes for 30 minutes. The light-shielding property was estimated by the fogging degree of the developed color printing paper or the photographic film.
  II A photographic color printing paper or a JIS 135 type photographic film was admitted in each exemplified magazine, and the magazine was allowed to stand at 30° C. under 80% RH for 12 hours. Then, the color printing paper or the photographic film was drawn out, and a fray at the cut portion, pile cutting dust and falling out of piles were estimated by adhered dusts on the face of the color printing paper or the photographic film.

TABLE-continued

III A photographic color printing paper or a JIS 135 type photographic film of ASA 100 was admitted in each exemplified magazine, and meander movement was estimated by the movement of the color printing paper or the photographic film during its drawing out and rolling up.

IV A photographic color printing paper or a JIS 135 type photographic film of ASA 100 was admitted in each exemplified magazine, and it was drawn out at a speed of 1 m/sec. This item was estimated by the scratches formed of the face of the color printing paper or the photographic film.

V Cost of the conventional teremp cloth was set as 100.

VI Time course of the humidity in each exemplified magazine was measured by a hygrometer.

VII Each exemplified magazine was left in the light of 80,000 luxes for 3 hours and then each item was judged.

As to each multilayer film 22 incorporated in the wall material of FIGS. 4 to 11, moisture permeability was measured. The thickness of the aluminum membrane layer was adjusted to 400 Å. Each 5 g of calcium chloride was placed in a completely sealed bag made of the multilayer film of 10 cm×10 cm in total area, and allowed to stand at 40° C. at 90% RH for 1 day. Thereafter, increase in weight of the calcium chloride was measured, and hygroscopic amount per m$^2$ was calculated. As a result, hygroscopic degrees of all of the multilayer films were less than 10 g/m$^2$·24 hrs. When lamination was carefully carried out so as not to form a scratch nor a crack on the aluminum membrane, the moisture permeability of all of the multilayer films became less than 3 g/m$^2$·24 hrs.

I claim:

1. In a magazine for a roll of a photosensitive strip material which includes a core rotatably supporting said roll of photosensitive strip material and a light-shielding container body admitting said core and having an opening for drawing out said photosensitive strip material and having light-shielding teremp cloth provided at said opening, the improvement comprising a plurality of wall sections defining said container body, each of said plurality of wall sections being formed by paper board and a multilayer film laminated thereon and having a metal foil layer or a metallized flexible sheet layer visible from exteriorly of the roll and the ground fabric structure of said teremp cloth being a knit structure.

2. The magazine of claim 1 wherein said metal foil layer is an aluminum foil layer having a thickness of 6 to 20 μm.

3. The magazine of claim 1, wherein said metallized flexible sheet layer consists of a thermoplastic resin layer 7 to 70 μm in thickness and a metallic membrane layer 50 to 1200 Å in thickness.

4. The magazine of claim 3, wherein said metallized flexible sheet layer consists of a uniaxially or biaxially oriented film of a thermoplastic resin selected from the group consisting of polypropylene, nylon, polyethylene and polyester having a thickness of 10 to 30 μm and an aluminum membrane layer having a thickness of 100 to 600 Å.

5. The magazine of claim 3, wherein an anchor coat layer is provided on said thermoplastic resin layer.

6. The magazine of claim 3, wherein a transparent or translucent protection layer is provided on said metallic membrane layer.

7. The magazine of any preceding claim, wherein one or more flexible sheet layers are incorporated in said multilayer film.

8. The magazine of claim 7, wherein said flexible sheet layers are selected from the group consisting of biaxially stretched polyester films, biaxially stretched polypropylene films, biaxially stretched nylon films and biaxially stretched polyethylene films.

9. The magazine of claim 1, wherein said teremp cloth has looped piles.

10. The magazine of claim 9, wherein piles of said teremp cloth are a mixture of looped piles and fluffed piles.

* * * * *